United States Patent
Pan et al.

(10) Patent No.: US 11,676,248 B2
(45) Date of Patent: Jun. 13, 2023

(54) DEEP RESIDUAL NETWORK FOR COLOR FILTER ARRAY IMAGE DENOISING

(71) Applicants: Baidu USA, LLC, Sunnyvale, CA (US); Baidu.com Times Technology (Beijing) Co., Ltd., Beijing (CN)

(72) Inventors: Zhihong Pan, San Jose, CA (US); Baopu Li, Santa Clara, CA (US); Hsuchun Cheng, Shenzhen (CN); Yingze Bao, Mountain View, CA (US)

(73) Assignees: Baidu USA LLC, Sunnyvale, CA (US); Baidu.com Times Technology (Beijing) Co., Ltd., Beijing (CN)

( * ) Notice: Subject to any disclaimer, the term of this patent is extended or adjusted under 35 U.S.C. 154(b) by 359 days.

(21) Appl. No.: 16/981,866

(22) PCT Filed: Jan. 23, 2020

(86) PCT No.: PCT/CN2020/074014
§ 371 (c)(1),
(2) Date: Sep. 17, 2020

(87) PCT Pub. No.: WO2021/147095
PCT Pub. Date: Jul. 29, 2021

(65) Prior Publication Data
US 2021/0241429 A1   Aug. 5, 2021

(51) Int. Cl.
*G06T 5/00* (2006.01)
*G06T 5/50* (2006.01)
(Continued)

(52) U.S. Cl.
CPC ............ *G06T 5/002* (2013.01); *G06T 5/20* (2013.01); *G06T 5/50* (2013.01); *H04N 25/135* (2023.01);
(Continued)

(58) Field of Classification Search
CPC .. G06T 5/002; G06T 5/20; G06T 5/50; G06T 2207/10024; G06T 2207/20081;
(Continued)

(56) References Cited

U.S. PATENT DOCUMENTS 10,171,161 B1   1/2019   Côté et al.
2017/0185871 A1*  6/2017   Zhang .................. G06N 3/045
(Continued)

FOREIGN PATENT DOCUMENTS

CN   108876737 A   11/2018
CN   109859147 A   6/2019

OTHER PUBLICATIONS

Z. Pan, B. Li, H. Cheng and Y. Bao, "Deep Residual Network for MSFA Raw Image Denoising," ICASSP 2020-2020 IEEE International Conference on Acoustics, Speech and Signal Processing (ICASSP), Barcelona, Spain, 2020, pp. 2413-2417, doi: 10.1109/ICASSP40776.2020.9053201. (Year: 2020).*
(Continued)

*Primary Examiner* — Andrae S Allison
(74) *Attorney, Agent, or Firm* — North Weber & Baugh LLP

(57) ABSTRACT

Described herein are embodiments of a deep residual network dedicated to color filter array mosaic patterns. A mosaic stride convolution layer is introduced to match the mosaic pattern of a multispectral filter arrays (MSFA) or a color filter array raw image. Embodiments of a data augmentation using MSFA shifting and dynamic noise are applied to make the model robust to different noise levels. Embodiments of network optimization criteria may be created by using the noise standard deviation to normalize the $L^1$ loss function. Comprehensive experiments demonstrate
(Continued)

that embodiments of the disclosed deep residual network outperform the state-of-the-art denoising algorithms in MSFA field.

20 Claims, 7 Drawing Sheets

(51) Int. Cl.
G06T 5/20 (2006.01)
H04N 25/13 (2023.01)
G06N 3/08 (2023.01)

(52) U.S. Cl.
CPC ...... G06N 3/08 (2013.01); G06T 2207/10024 (2013.01); G06T 2207/20081 (2013.01); G06T 2207/20084 (2013.01); G06T 2207/20224 (2013.01)

(58) Field of Classification Search
CPC .......... G06T 2207/20084; G06T 2207/20224; H04N 9/04559; G06N 3/08; G06N 3/0454
See application file for complete search history.

(56) References Cited

U.S. PATENT DOCUMENTS

| | | | | |
|---|---|---|---|---|
| 2019/0095745 | A1* | 3/2019 | Bao | G05D 1/0246 |
| 2019/0325199 | A1* | 10/2019 | Wang | G06N 3/08 |
| 2020/0402205 | A1* | 12/2020 | Su | G06T 3/4046 |
| 2022/0130012 | A1* | 4/2022 | Park | G06T 3/4046 |

OTHER PUBLICATIONS

Lu, Liqiang, et al. "An efficient hardware accelerator for sparse convolutional neural networks on FPGAs." 2019 IEEE 27th Annual International Symposium on Field-Programmable Custom Computing Machines (FCCM). IEEE, 2019. (Year: 2019).*
Wu, Renjie, et al. "Optimized multi-spectral filter arrays for spectral reconstruction." Sensors 19.13 (2019): 2905. (Year: 2019).*
Ren, Haoyu, Mostafa El-Khamy, and Jungwon Lee. "On-resnet: Efficient deep residual network for image denoising." Asian Conference on Computer Vision. Springer, Cham, 2018. (Year: 2018).*
Al-Khafaji et al., "Spectral-spatial scale invariant feature transform for hyperspectral Images," IEEE Transactions on Image Processing, vol. 27, No. 2, 2018. (15pgs).
Uemori et al.,"Skin-based identification from multispectral image data using CNNs," in Proc. of the IEEE Con. on Computer Vision and Pattern Recognition, 2019. (10pgs).
Zhang et al.,"Color demosaicking by local directional interpolation and nonlocal adaptive thresholding," Journal of Electronic imaging, vol. 20, No. 2, 2011. (29 pgs).
Kiku et al., "Beyond color difference: Residual interpolation for color image demosaicking," IEEE Transactions on Image Processing, vol. 25, No. 3, 2016. (13pgs).
Park et al.,"A case for denoising before demosaicking color filter array data," in 2009 Con. Record of the 43rd Asilomar Con. on Signals, Systems & Computers. IEEE, 2009.(5pgs.
Akiyama et al.,"Pseudo four-channel image denoising for noisy cfa raw data," in 2015 IEEE Intr. Con. on Image Processing (ICIP). IEEE, 2015. (5pgs).
Condat et al.,"Joint demosaicking and denoising by total variation minimization," in the19th IEEE Intr. Con. on Image Processing, IEEE, 2012. (5pgs).

Jeon et al.,"Demosaicking of noisy bayersampled color images with least-squares luma-chroma demultiplexing and noise level estimation," IEEE Transactions on Image Processing, vol. 22, No. 1, 2012. (11 pgs).
Zhang et al.,"Beyond a gaussian denoiser: Residual learning of deep CNN for image denoising," arXiv preprint arXiv:1608.03981, 2016. (13pgs).
Monno et al.,"Single-sensor RGB-NIR imaging: Highquality system design and prototype implementation," IEEE Sensors Journal, vol. 19, No. 2, pp. 497-507, 2019.(3pgs).
Buades et al.,"A non-local algorithm for image denoising," in Computer Society Con. on Computer Vision & Pattern Recognition (CVPR'05). IEEE, 2005. (6pgs).
Dabov et al.,"Image denoising with block-matching and 3d filtering," In Proc. of SPIE: The International Society for Optics Engineering, 2006. (13pgs).
Kokkinos et al., "Deep image demosaicking using a cascade of convolutional residual denoising networks," arXiv preprint arXiv:1803. 05215, 2018. (17pgs).
Gharbi et al.,"Deep joint demosaicking and denoising," ACM Transactions on Graphics (TOG), vol. 35, No. 6, 2016. (12pgs).
Kokkinos et al.,"Iterative joint image demosaicking and denoising using a residual denoising network," arXiv preprint arXiv:1807. 06403, 2019. (12pgs).
Monno et al.,"Adaptive residual interpolation for color and multispectral image demosaicking," Sensors, vol. 17, No. 12, 2017. (21 pgs).
Mihoubi et al.,"Multispectral demosaicing using pseudo-panchromatic image," IEEE Transactions on Computational Imaging, vol. 3, No. 4, 2017. (31 pgs).
Shinoda et al.,"Deep demosaicking for multispectral filter arrays," arXiv preprint arXiv:1808.08021, 2018. (4 pgs).
Habtegebrial et al.,"Deep convolutional networks for snapshot hypercpectral demosaicking," in10th Workshop on Hyperspectral Image & Signal Processing, IEEE, 2019. (2pgs).
Pan et al.,"Deep panchromatic image guided residual interpolation for multispectral image demosaicking,"10th Workshop on Hyperspectral Image & Signal Processing,IEEE, 2019. (3.
Yasuma et al.,"Generalized assorted pixel camera: postcapture control of resolution, dynamic range, and spectrum," IEEE transactionsons on image processing, 2010. (13pgs).
Nascimento et al.,"Spatial distributions of local illumination color in natural scenes," Vision research, vol. 120, pp. 39-44, 2016. (6pgs).
The Extended European Search Report dated Dec. 22, 2022, In European Application No. 20 91 5185. (10pgs).
Chang et al.,"HSI-DeNet: Hyperspectral Image Restoration via Convolutional Neural Network," In IEEE Transactions on Geoscience and Remote Sensing, vol. 57, 2019. (16pgs).
Dijkstra et al.,"Hyperspectral demosaicking and crosstalk correction using deep learning," Machine Vision and Applications, Springer Verlag, vol. 30, No. 1, 2018. (21pgs).
Huang et al.,"Lightweight Deep Residue Learning for Joint Color Image Demosaicking and Denoising," In 24th International Conference on Pattern Recognition (ICPR), 2018. (6pgs).
Kokkinos et al.,"Iterative Joint Demosaicking and Denoising Using a Residual Denoising Network", In IEEE Transactions on Image Processing, vol. 28, No. 8, 2019.(12pgs).
Yuan et al.,"Hyperspectral Image Denoising Employing a Spatial-Spectral Deep Residual Convolutional Neural Network," Arxiv.Org, Cornell University Library, Jun. 2018. (14pgs).
International Search Report dated Oct. 29, 2020, in International Patent Application No. PCT/CN2020/074014, filed Jan. 23, 2020. (5pgs).
Written Opinion of the International Searching Authority dated Oct. 29, 2020, in International Patent Application No. PCT/CN2020/ 074014, filed Jan. 23, 2020. (4 pgs).

* cited by examiner

DEEP RESIDUAL NETWORK FOR COLOR FILTER ARRAY IMAGE DENOISING

CROSS-REFERENCE TO RELATED APPLICATIONS

This patent application is filed pursuant to 35 USC § 371 as a US National Phase Application of International Patent Application No. PCT/CN2020/074014, filed on 23 Jan. 2020, entitled "DEEP RESIDUAL NETWORK FOR COLOR FILTER ARRAY IMAGE DENOISING," listing Zhihong Pan, Baopu Li, Hsuchun Cheng, and Yingze Bao as inventors, which patent document is incorporated by reference herein in its entirety and for all purposes.

BACKGROUND

A. Technical Field

The present disclosure relates generally to systems and methods for image processing. More particularly, the present disclosure relates to systems and methods for multispectral image denoising.

B. Background

Multispectral filter arrays (MSFA) are increasingly used in multispectral imaging. Although many previous works studied the denoising algorithms for color filter array (CFA)-based cameras, denoising MSFA raw images is little discussed.

Compared to CFA, major challenges for denoising MSFA data include: 1) MSFA data contains more channels than CFA and no channel is predominant; and 2) it is non-trivial to design a denoising process to be compatible with a subsequent demosaicking process.

Accordingly, what is needed are systems and methods for MSFA or CFA image denoising for improved performance.

BRIEF DESCRIPTION OF THE DRAWINGS

References will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments. Items in the figures are not to scale.

DETAILED DESCRIPTION OF EMBODIMENTS

Figure 1:
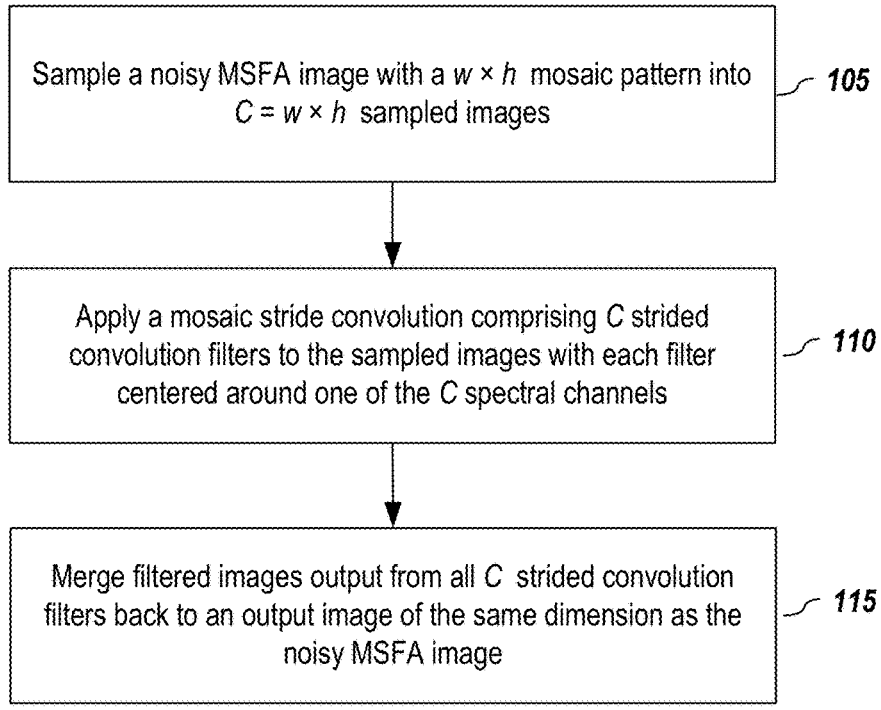
FIG. 1 depicts a process of mosaic stride convolution according to embodiments of the present document.

In the following description, for purposes of explanation, specific details are set forth in order to provide an understanding of the invention. It will be apparent, however, to one skilled in the art that the invention can be practiced without these details. Furthermore, one skilled in the art will recognize that embodiments of the present invention, described below, may be implemented in a variety of ways, such as a process, an apparatus, a system, a device, or a method on a tangible computer-readable medium.

Components, or modules, shown in diagrams are illustrative of exemplary embodiments of the invention and are meant to avoid obscuring the invention. It shall also be understood that throughout this discussion that components may be described as separate functional units, which may comprise sub-units, but those skilled in the art will recognize that various components, or portions thereof, may be divided into separate components or may be integrated together, including integrated within a single system or component. It should be noted that functions or operations discussed herein may be implemented as components. Components may be implemented in software, hardware, or a combination thereof.

Furthermore, connections between components or systems within the figures are not intended to be limited to direct connections. Rather, data between these components may be modified, re-formatted, or otherwise changed by intermediary components. Also, additional or fewer connections may be used. It shall also be noted that the terms "coupled," "connected," or "communicatively coupled" shall be understood to include direct connections, indirect connections through one or more intermediary devices, and wireless connections.

Reference in the specification to "one embodiment," "preferred embodiment," "an embodiment," or "embodiments" means that a particular feature, structure, characteristic, or function described in connection with the embodiment is included in at least one embodiment of the invention and may be in more than one embodiment. Also, the appearances of the above-noted phrases in various places in the specification are not necessarily all referring to the same embodiment or embodiments.

The use of certain terms in various places in the specification is for illustration and should not be construed as limiting. A service, function, or resource is not limited to a single service, function, or resource; usage of these terms may refer to a grouping of related services, functions, or resources, which may be distributed or aggregated. A "layer" may comprise one or more operations. The words "optimal," "optimize," "optimization," and the like refer to an improvement of an outcome or a process and do not require that the specified outcome or process has achieved an "optimal" or peak state.

The terms "include," "including," "comprise," and "comprising" shall be understood to be open terms and any lists the follow are examples and not meant to be limited to the listed items. Any headings used herein are for organizational purposes only and shall not be used to limit the scope of the description or the claims. Each reference mentioned in this patent document is incorporate by reference herein in its entirety.

Furthermore, one skilled in the art shall recognize that: (1) certain steps may optionally be performed; (2) steps may not be limited to the specific order set forth herein; (3) certain steps may be performed in different orders; and (4) certain steps may be done concurrently.

A. Introduction

Hyperspectral and multispectral imaging have been widely used in a number of applications. While conventional push-broom scanner has been the most commonly used hyperspectral imaging system, snapshot multispectral cameras have attracted significant popularity recently for their low cost and high collection speed. They use multispectral filter arrays (MSFA) technology to capture a multispectral image (MSI) in one exposure. Compared to RGB (Red-Green-Blue) only data, MSFA data benefits a great number of computer vision applications by providing higher spectral resolution, such as spectral-spatial SIFT and human identification using hand skin. Low level imaging processing methods, e.g., denoising and demosaicking, have been studied for CFA-based imaging. However, few previous works looked into denoising and demosaicking for MSFA raw images. When CFA with Bayer pattern was initially disclosed, most demosaicking methods were presented as a preprocessing step for denoising. Some noticed that the demosaicking process changes the Gaussian nature of sensor noise, and proposed to switch the processing order to perform denoising on CFA raw image before demosaicking. Alternatively, various methods have been introduced to solve demosaicking and denoising jointly. Recently, with the rapid development of convolutional neural networks (CNN), some deep learning models have been proposed for denoising, demosaicking, or joint demosaicking and denoising.

However, as elaborated further in the present document, most of these CFA-oriented methods are not suited for MSFA-based multispectral cameras. To fill this gap, certain demosaicking methods for CFA have been put forward recently. For instance, in the case of a 4×4 MSFA pattern, the dominant green band was used as the guide for residual interpolations to achieve MSI demosaicking. For MSFA patterns without dominant bands, a pseudo-panchromatic image difference (PPID) method estimated a pseudo-panchromatic image first which was used as a guide to smooth its difference with each sampled band. Recently, deep learning methods by Shinoda et al. ("Deep demosaicking for multispectral filter arrays", arXiv preprint arXiv:1808.08021, 2018) and Habtegebrial et al. ("Deep convolutional networks for snapshot hyperspectral demosaicking", 2019 IEEE 10th Workshop on Hyperspectral Image and Signal Processing: Evolution in Remote Sensing) showed superior results over PPID. The inventors of the present invention previously recovered a deep panchromatic image (DPI) from MSFA raw image using a novel DPI-Net and completed demosaicking using DPI as the guide for residual interpolation. The results demonstrated further improvement over the Shinoda model with higher computational efficiency. However, in the context of denoising, there is few methods designed for MSFA raw image.

In the present document, embodiments of a deep residual network are disclosed to tackle the MSFA raw denoising problem. Given the uniqueness of MSFA mosaic patterns, embodiments of the network use a mosaic stride convolutional layer before layers of residual blocks. Additionally, an embodiment using a loss function that utilizes $L^1$ loss normalized by noise standard deviation is introduced to optimize network convergence. Moreover, MSFA shifting and dynamic noise are disclosed for noise tolerant data augmentation. For comparison purpose, two baseline methods are implemented: a split-channel denoising process for MSFA raw image based on a prior CFA method, and a deep learning based method (the DPI-Net). All three methods (an embodiment of the present disclosure and two baselines) are evaluated using peak signal-to-noise ratio (PSNR) metric. Comparison results show that embodiments of the present disclosure are superior at all noise levels with a significant margin.

B. Embodiments of MSFA Denoising Before Demosaicking

In one or more embodiments, the MSFA raw image Y may be an observed form of the latent noise-free multispectral image X as shown below:

$$y = Mx + n \quad (1)$$

where $y \in \mathbb{R}^N$, $x \in \mathbb{R}^{N \times C}$ are a vectorized versions of Y and X. C is the number of spectral channels, N is the number of pixels per channel, M is the matrix representing the sampling process for MSFA mosaic and n is the noise that accounts for all errors introduced in image acquisition, assumed as signal independent additive white Gaussian noise (AWGN) with zero-mean.

In one or more embodiments, the mosaic sampling process may also be expressed in Equation (2) where z is the noise-free MSFA raw image, x̃ is the image (e.g., in a form of panchromatic image) averaged from all spectral channels of X and m is an additive signal introduced by mosaic sampling.

$$z = Mx = \tilde{x} + m \quad (2)$$

For denoising in the denoising-before-demosaicking process of MSFA raw data as shown in Equation (3), it may be challenging to remove n while preserving m as both are additive terms that change image signals in the gray scale image (or panchromatic image) x̃ in similar fashions.

$$\hat{z} = D_n(z+n) = D_n(\tilde{x} + m + n) \quad (3)$$

In one or more embodiments, the optimal denoiser $\hat{D}_n(\cdot)$ may be found by solving the following optimization problem:

$$\hat{D}_n(\cdot) = \min_{D_n(\cdot)} \sum_{n \in S(n)} \sum_{M \in S(M)} \sum_{x \in S(x)} \|D_n(Mx+n) - Mx\|_l \quad (4)$$

where $\|\cdot\|_l$ represents $L^1$-Norm, S(n), S(M) and S(x) are the sets of parameter space for all noises, mosaic sampling processes and latent multispectral images respectively, Mx refers as the ground-truth noise free image. When an MSFA mosaic pattern of C channels is given, the set of possible M sampling process is limited to C unique options as shown in Equation (5) where each $M_i$ starts sampling x from one spectral channel i.

$$S(M) = \{M_i | i \in \{1, 2, \ldots, C\}\} \quad (5)$$

C. Color Filter Array Denoising Method Embodiments

1. Mosaic Stride Convolution Embodiments

One unique challenge of MSFA raw image denoising is the separation of m and n as in Equation (4). The difference between m and n is that the variance of n is spatially uniform while m has a mosaic pattern caused by signal changes in different spectral channels. In one or more embodiments, a mosaic stride convolution scheme is first introduced to account for the difference between spectral channels. This may also partially overcome the first challenge mentioned before. For a w×h mosaic pattern, when one convolution filter is applied at a stride of w×h, the central pixel of all receptive fields are from one specific spectral channel to get weights for channels based on noise.

FIG. 1 depicts a process of mosaic stride convolution according to embodiments of the present document. Given a noisy color filter array image (e.g., a noisy MSFA image) with a w×h mosaic pattern, the image is sampled (105), using C=w×h strided convolution channels, into C=w×h sampled images. A mosaic stride convolution comprising C=w×h strided convolution filters is applied (110) to the sampled images with each of them centered around one of the C spectral channels. In one or more embodiments, a strided convolution channel corresponds to a spectral channel in the color filter array. Each sampled image is filtered by a convolution kernel at a w×h stride. In one or more embodiments, the size of the convolution kernel may be different according to different designs. The filtered images output from all C filters are then merged (115) back to an output image of the same dimension as the input when proper padding is included.

Figure 2:
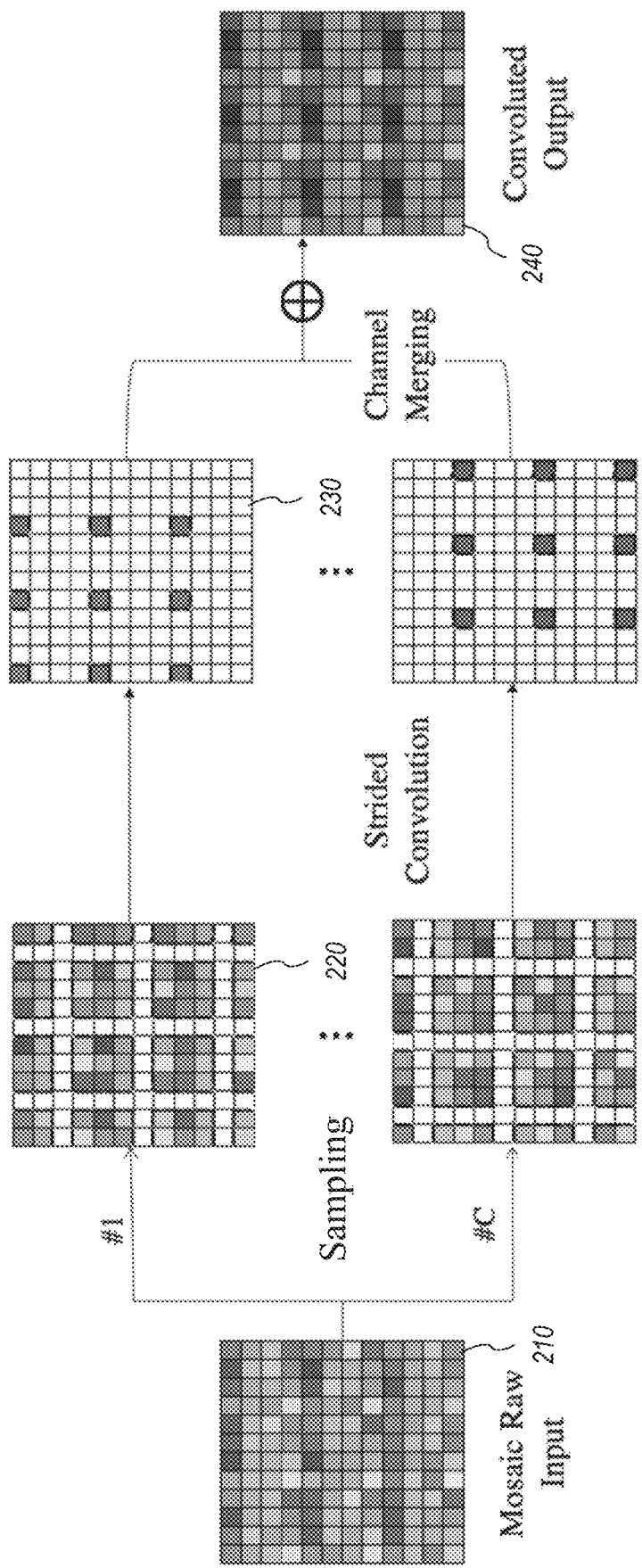
FIG. 2 graphically depicts an example of mosaic stride convolution according to embodiments of the present document.

An example of a 4×4 mosaic stride convolution process is graphically shown in FIG. 2. It shall be noted that the convolution kernel size is set as 3×3 and the MSFA image is shown in false grey-scale where each grey-scale represents pixels of one spectral channel. As shown in FIG. 2, an MSFA image 210 with 4×4 mosaic pattern is sampled using 16 channels or filters to obtain 16 sampled images 220. In this embodiment, each sampled image is filtered by a 3×3 convolution at a 4×4 stride into a filtered image 230, although the filters and/or the starting positions of the filters may be different across the 16 filters. All filtered images are then merged as a convoluted output image 140 of the same dimension as the MSFA image 210. In one or more embodiments, the convoluted output image 140 may then be processed at one or more rectified linear unit (ReLU) filters to output a rectified output for further denoising processing. In one or more embodiments, the one or more ReLU filters are parametric rectified linear unit (PReLU) filters. Although in the embodiment shown in FIG. 2, the convolution kernel of the filters has a size of 3×3 and therefore, the images 220 are sampled images from the mosaic raw input, one skilled in the art shall understand that the convolution kernel size may have a different size. In one or embodiments, the convolution kernel may be equal to or even larger than the mosaic pattern, and therefore all pixels of the raw image are needed for each mosaic-stride convolution even though the filtered image from each channel consists of only a subset.

Although FIG. 1 and FIG. 2 are described using MSFA images for illustration, one skilled in the art shall understand that the disclosed method and process may be applicable to CFA image denoising as well.

2. Color Filter Array Denoising Network Embodiments

Figure 3:
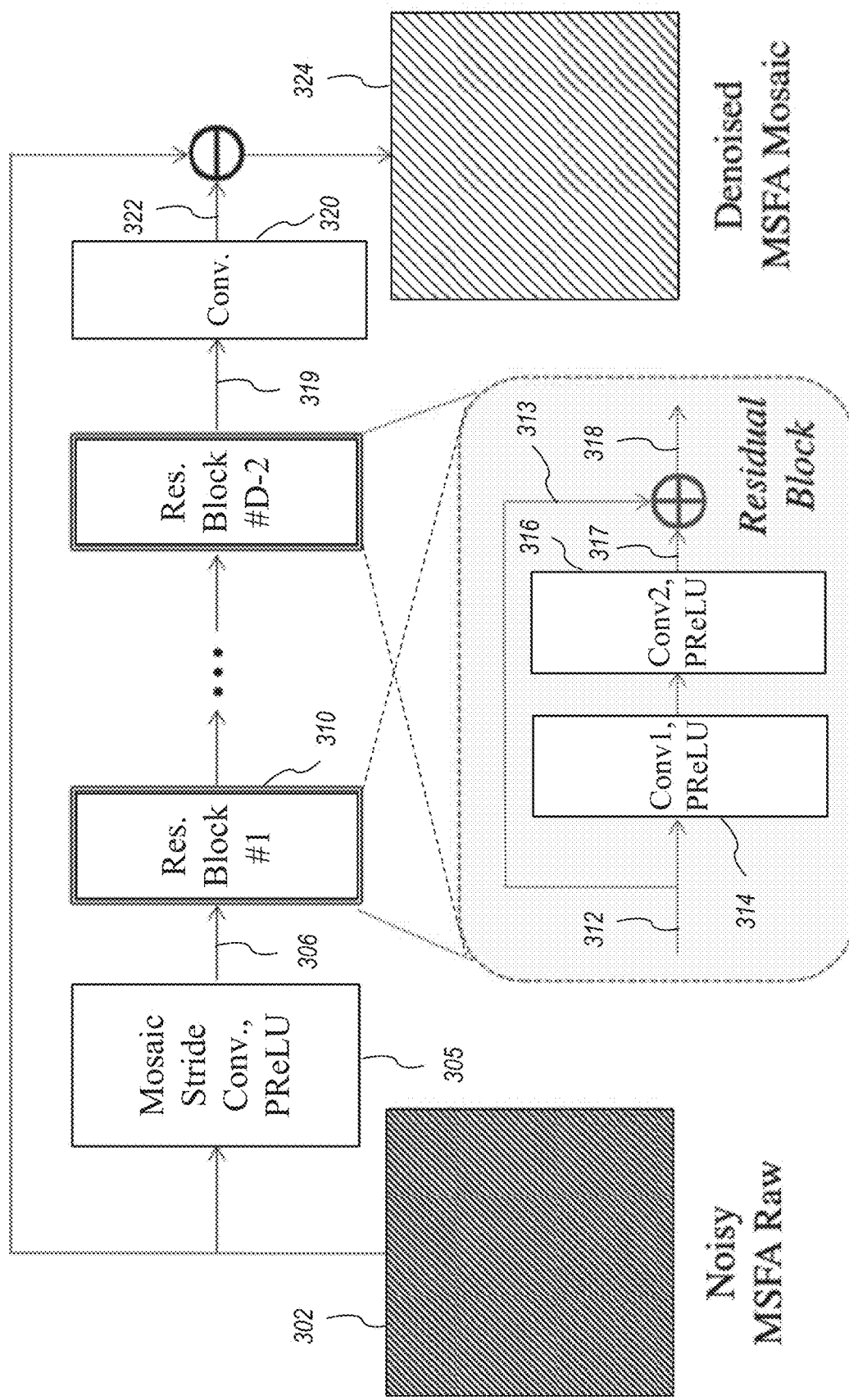
FIG. 3 depicts network architecture for MSFA denoising according to embodiments of the present document.
Figure 4:
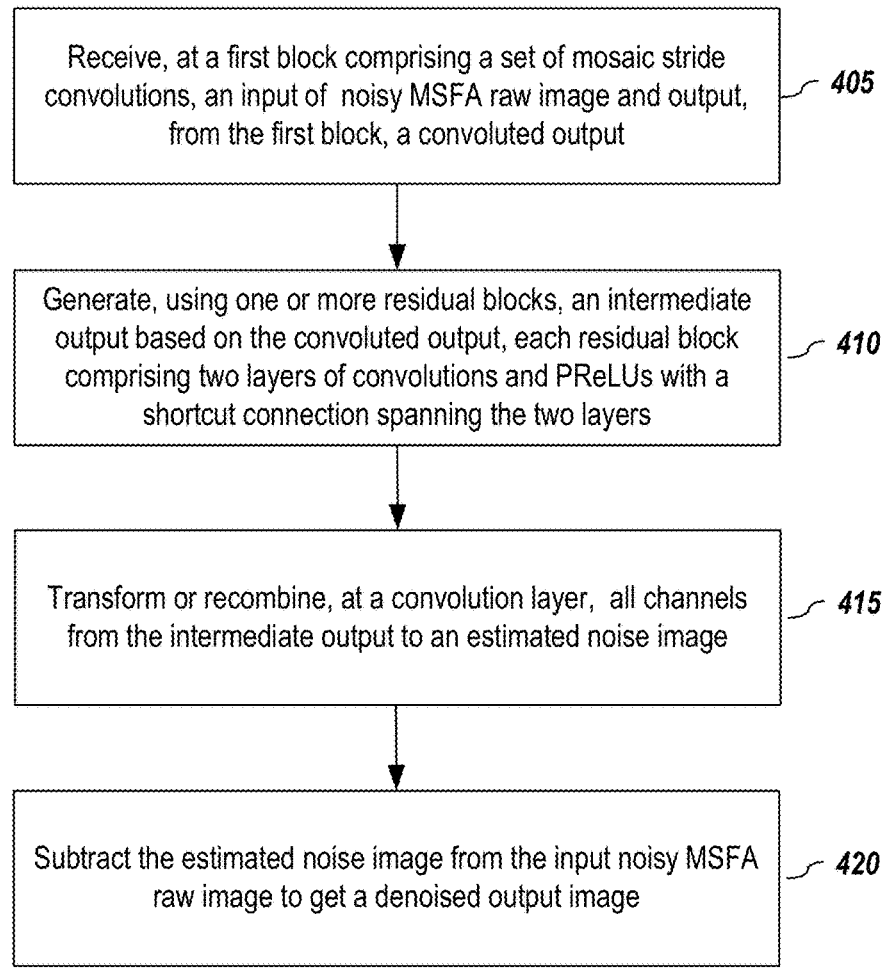
FIG. 4 depicts a process for MSFA denoising according to embodiments of the present document.

In one or more embodiments, a deep residual network is disclosed to estimate noise from a noisy color filter array raw mosaic image. The raw mosaic image may be obtained with a color filter array (e.g., a RGGB color filter) or MSFA, which may comprise more channels than traditional RGGB filter and may go beyond visible band. Architecture of the denoising network is depicted in FIG. 3, according to one or more embodiments of the present document. FIG. 4 depicts a process for MSFA denoising with reference to the denoising network shown in FIG. 3, according to one or more embodiments of the present document. The network 300 has a total depth (or number of blocks, e.g., 7 or 9) of D. The first block 305 comprises a set of mosaic stride convolutions. The first block 305 couples to receive (405) an input of noisy MSFA raw image 302 and output a convoluted output 306. In one or more embodiments, the aforementioned mosaic stride convolution in section C.1 is also applicable in FIG. 3. For the middle D-2 residual block 310, each includes two layers 314 and 316 of convolutions and PReLUs with a shortcut connection 313 spanning the two layers, wherein an input 312 of each residual block is added to an output 317 of the second layer 316 to obtain a residual block output 318 for each residual block. Although PReLUs are shown in the residual blocks 310 in FIG. 3, one skilled in the art shall understand that other activation functions, such as general ReLUs or Leaky ReLUs, may also be employed in one or more embodiments of the present disclosure. Such variations shall be within the scope of the present invention. The one or more middle blocks 310 generate (410) an intermediate output 319. The last or final block 320 is a convolutional layer to transform or recombine (415) all channels from the intermediate output 319 to an estimated noise image 322, which is subtracted (420) from the input noisy MSFA raw image 302 to get a denoised output image 324. In one or more embodiments, the first block 305 may further comprise one or more activation functions, such as ReLU or PReLU filters, following the mosaic stride convolutions for further processing, and therefore the convoluted output 306 from the first block 305 may be a rectified convoluted output.

In one or more embodiments, the first block 305 comprises multiple mosaic stride convolutional layers, which may be coupled in series for multiple implementations. In one or more embodiment, a mosaic stride convolutional layer may be followed by one or more parameterized rectified linear unit (PReLU) filters such that the first block has a structure of a mosaic stride convolutional layer, PReLU filter(s), a mosaic stride convolutional layer, PReLU filter(s), . . . , a mosaic stride convolutional layer, PReLU filter(s). A convoluted output from one a mosaic stride convolutional layer is rectified by the following PReLU filter(s), which is then processed by a next mosaic stride convolutional layer for another implementation of sampling, strided convolution, and merging, and so forth.

In addition to the above novel structure shown in FIG. 3, two new augmentation methods, MSFA shifting and dynamic variant noises, may be applied according to one or more embodiments of the present document. When x is known, MSFA shifting is using different $M_i$ in Equation (5) for mosaic sampling as each $M_i$ is shifting the sampling window by one pixel vertically or horizontally. Moreover, to minimize the prediction error at all noise levels, one noise-free mosaic raw image could be augmented to include various noise levels as inputs. To improve the augmentation efficiency, the training data may be dynamically augmented by changing the added noise at different iterations. Such a dynamical augmentation may be implemented to save storage space for training, thus greatly improving training efficiency. The MSFA shifting increases sampling in the S(M) space of Equation (4), and the dynamic noise augmentation method also augments the samples in the S(n) space. As such, they may alleviate the two challenges mentioned before because of at least the following two reasons. First, it provides more training samples that may boost the denoising ability of the $D_n(\cdot)$. In addition, the above two augmentations are independent so it helps separate m and n in the denoising process.

To further improve the model's robustness to various noise levels, in one or more embodiments, a new form of loss function that normalizes the $L^1$ loss (e.g. Least Absolute Deviations) by noise standard deviation as shown below is utilized.

$$\text{Loss} = \frac{\sum_{i=0}^{N} |z_i - \hat{z}_i|}{N \times \sigma} \tag{6}$$

where N is the number of pixels, a is noise level, z is the noise-fee MSFA raw image as ground-truth, and $\hat{z}$ is the denoised MSFA image. With the new data augmentation and normalized loss, embodiments of the present disclosure do not need an explicit input of noise standard deviation, as in one prior CFA raw image denoising work (H. Akiyama, et al., "Pseudo four-channel image denoising for noisy CFA raw data," in 2015 IEEE International Conference on Image Processing, pp. 4778-4782).

3. Split-Channel Denoising Embodiments

Figure 5:
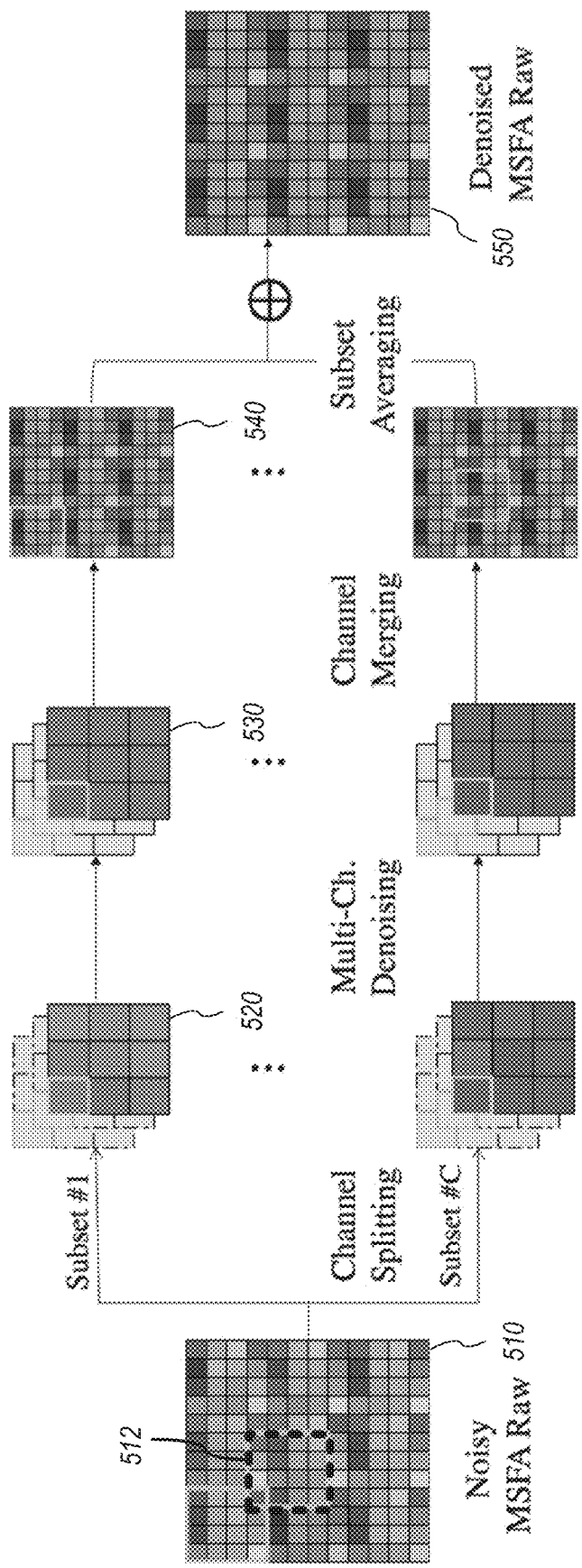
FIG. 5 graphically depicts a pipeline of MSFA split-channel denoising according to embodiments of the present document.
Figure 6:
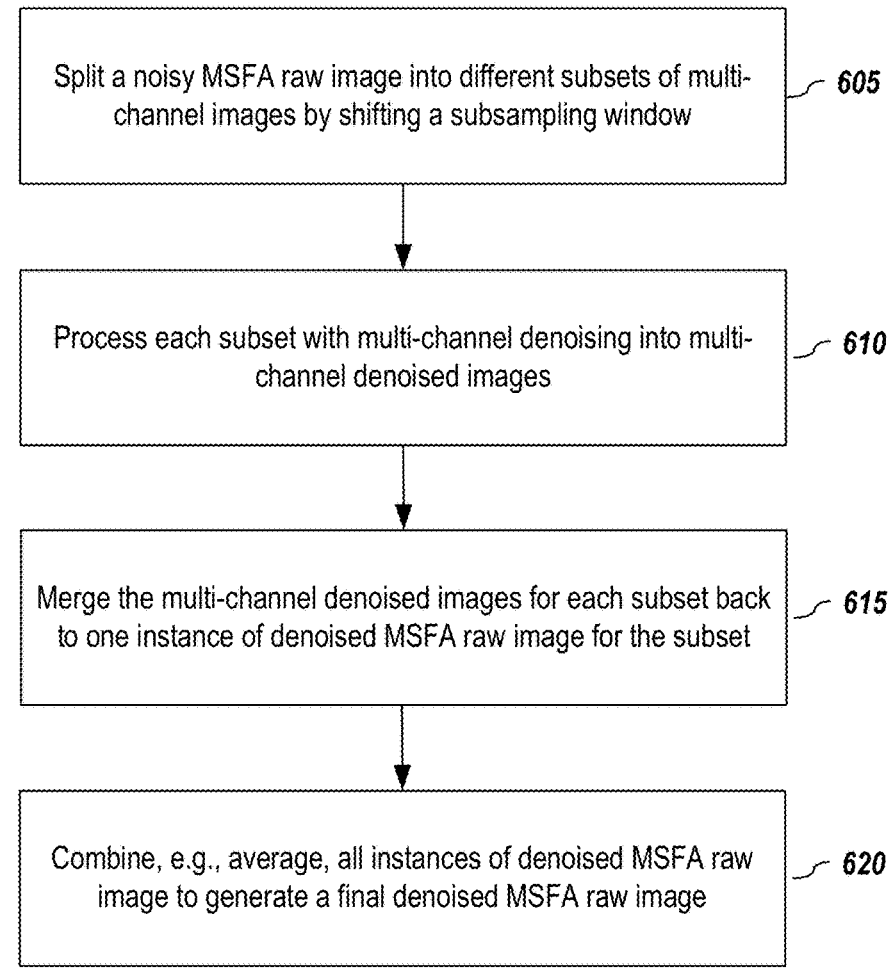
FIG. 6 depicts a process for MSFA split-channel denoising according to embodiments of the present document.

In the prior CFA raw image denoising work by Akiyama (as referenced above), a four-channel image denoising method with block artifact deduction was shown to outperform prior methods. For comparison, this four-channel image denoising method is generalized for MSFA applications in one or more embodiments of the present document. FIG. 5 and FIG. 6 respectively depict a pipeline and a process of MSFA split-channel denoising according to embodiments of the present document. For an MSFA pattern of C channels, as depicted in FIG. 5, a noisy MSFA raw image 510 may be split into a multi-channel image, and each corresponds to one of the C spectral channels. The noisy MSFA raw image 510 is split (605) into C different subsets of multi-channel images 520 by shifting a sampling window (e.g. the 4×4 squares 512 at the head picture in FIG. 5). The sampling window 512 depicts one sampling window of each subset, and the 4×4 pixels in that window correspond to a pixel at a fixed location of that subset of 16-channel images. To get all pixels of that subset, the sampling window scans through the full raw image without overlap and without gap between neighboring windows. For each subset, it is processed (610) with multi-channel denoising into multi-channel denoised images 530, which are then merged (615) back to one instance of denoised MSFA raw image 540 for the subset. All instances of denoised MSFA raw image, with one for each multi-channel subset, are combined (620), e.g., by averaging, to reduce block artifacts and to generate a final denoised MSFA raw image 550.

D. Some Experimental Results

It shall be noted that these experiments and results are provided by way of illustration and were performed under specific conditions using a specific embodiment or embodiments; accordingly, neither these experiments nor their results shall be used to limit the scope of the disclosure of the current patent document.

In one or more experimental settings, four different multispectral datasets, including three indoor and one outdoor datasets, were used for tests. All datasets were converted to reflectance values between 0 to 1 and resampled to 16 bands with central wavelengths at $\lambda_i \in \{469, 480, 489, 499, 513, 524, 537, 551, 552, 566, 580, 590, 602, 613, 621, 633\}$ (nm). In one or more experimental settings, a 4×4 mosaic pattern was used to sample these preprocessed MSI images to MSFA raw images. In one or more experimental settings, two indoor datasets and one outdoor dataset were used for training and validation of deep learning network embodiments of the present disclosure. The remaining indoor dataset was used in testing for all three sets of experiments to compare the average PSNRs of all 31 images.

The first set of experiments, denoted as 1*, used the split-channel denoising method as in Section C.3. In one or more experimental settings, a nonlocal means method (A. Buades, et al., "A non-local algorithm for image denoising," in 2005 IEEE Computer Society Conference on Computer Vision and Pattern Recognition, vol. 2, pp. 60-65) was chosen in place of block-matching and 3D filtering (BM3D) for the multi-channel denoising step to get higher PSNR results.

The second set of experiments, denoted as 2*, utilized the aforementioned DPI-Net for denoising, maintaining the network architecture and configurations like kernel sizes and number of filters. It shall be noted that the network depth D was increased to 11 in the second set of experiments. All training images were segmented to 128×128 patches without data augmentation. Each patch was added with static AWGN noise whose a was randomly picked from an uniform distribution between 0 and 0.2 before used as training input. The network was trained by minimizing a Mean Squared Error (MSE) loss between the predicted and ground truth MSFA raw images using the Adam optimizer, all implemented in the PyTorch platform.

For the last set of experiments, embodiments of the present disclosure were trained in three steps. First, starting from the trained DPI-Net model in experiment 2*, the network was further trained with data augmentation, including flipping, rotation and MSFA shifting. Training data was also augmented dynamically by changing the added noise for each input image after one iteration. Secondly, a normalized $L^1$ loss was used to further train the model from the previous step. Lastly, weights from the DPI-Net model trained in the second step were transferred to a deep residual network embodiment, where weights from the first convolutional layer of DPI-Net were used to initialize each set of strided convolution filters in a mosaic stride convolutional layer within the deep residual network embodiment.

The average PSNRs of images for all three sets of experiments are shown in Table 1. The added noise level varies from 0.01 to 0.2 and the PSNRs from the noisy raw images are included for reference. It shows that, comparing to 1*, the deep learning baseline method embodiment 2* yields significantly higher PSNR at all noise levels except for σ=0.01. It also demonstrates the results from the proposed method are the best at all noise levels. It exceeds methods 1* and 2* by up to 9.88 (σ=0.2) and 3.79 (σ=0.01) in PSNR respectively.

TABLE 1

The average PSNRs of images with the best results at each noise level in bold.

| σ | 0.01 | 0.02 | 0.05 | 0.1 | 0.2 |
|---|---|---|---|---|---|
| Noisy | 40.40 | 34.67 | 27.21 | 21.65 | 16.16 |
| 1* | 46.56 | 41.88 | 34.98 | 29.22 | 23.37 |
| 2* | 44.70 | 42.47 | 38.88 | 35.84 | 32.37 |
| Proposed | 48.49 | 44.99 | 40.34 | 36.84 | 33.25 |

*means adapted for MSFA denoising based on the original method.

The PSNR results of the intermediate results from the last experiment are compared in Table 2 to show each step's effects. As shown in the embodiment of Proposed (1), the suggested data augmentation techniques improved PSNR performance significantly for all noise levels. In the embodiment of Proposed (2), the normalized loss function increased PSNR drastically for lower noise levels while keeping the performance for all levels except the 0.2 drop for σ=0.2. Lastly, the added mosaic stride convolution further improved the well-trained model at all noise levels.

TABLE 2

Comparison of results from three training stages of the proposed model embodiments: (1) adding data augmentation; (2) changing to normalized loss; (3) adding mosaic stride convolution.

| σ | 0.01 | 0.02 | 0.05 | 0.1 | 0.2 |
|---|---|---|---|---|---|
| 2* | 44.70 | 42.47 | 38.88 | 35.84 | 32.37 |
| Proposed (1) | 46.19 | 43.64 | 39.84 | 36.68 | 33.23 |
| Proposed (2) | 48.23 | 44.82 | 40.27 | 36.75 | 33.03 |
| Proposed (3) | 48.49 | 44.99 | 40.34 | 36.84 | 33.25 |

E. Some Conclusions

In the present patent disclosure, embodiments of a deep residual network are disclosed to resolve the challenges of denoising MSFA raw images. Multiple novel steps have been introduced in the proposed network, including mosaic stride convolution, data augmentation techniques such as MSFA shifting and dynamic noise, and $L^1$ loss normalized by noise standard deviation. All three steps have been demonstrated to be effective to improve the performance of the network. When they are combined, embodiments of the disclosed method have shown significant improvements over other state-of-the-art methods based on CFA raw denoising or the DPI-Net used in MSFA demosaicking.

One skilled in the art shall recognize that embodiments herein may be readily adapted or altered for CFA raw image denoising, and joint denoising and demosaicking for MSFA raw images.

F. System Embodiments

In embodiments, aspects of the present patent document may be directed to, may include, or may be implemented on one or more information handling systems/computing systems. A computing system may include any instrumentality or aggregate of instrumentalities operable to compute, calculate, determine, classify, process, transmit, receive, retrieve, originate, route, switch, store, display, communicate, manifest, detect, record, reproduce, handle, or utilize any form of information, intelligence, or data. For example, a computing system may be or may include a personal computer (e.g., laptop), tablet computer, phablet, personal digital assistant (PDA), smart phone, smart watch, smart package, server (e.g., blade server or rack server), a network storage device, camera, or any other suitable device and may vary in size, shape, performance, functionality, and price. The computing system may include random access memory (RAM), one or more processing resources such as a central processing unit (CPU) or hardware or software control logic, ROM, and/or other types of memory. Additional components of the computing system may include one or more disk drives, one or more network ports for communicating with external devices as well as various input and output (I/O) devices, such as a keyboard, a mouse, touchscreen and/or a video display. The computing system may also include one or more buses operable to transmit communications between the various hardware components.

Figure 7:
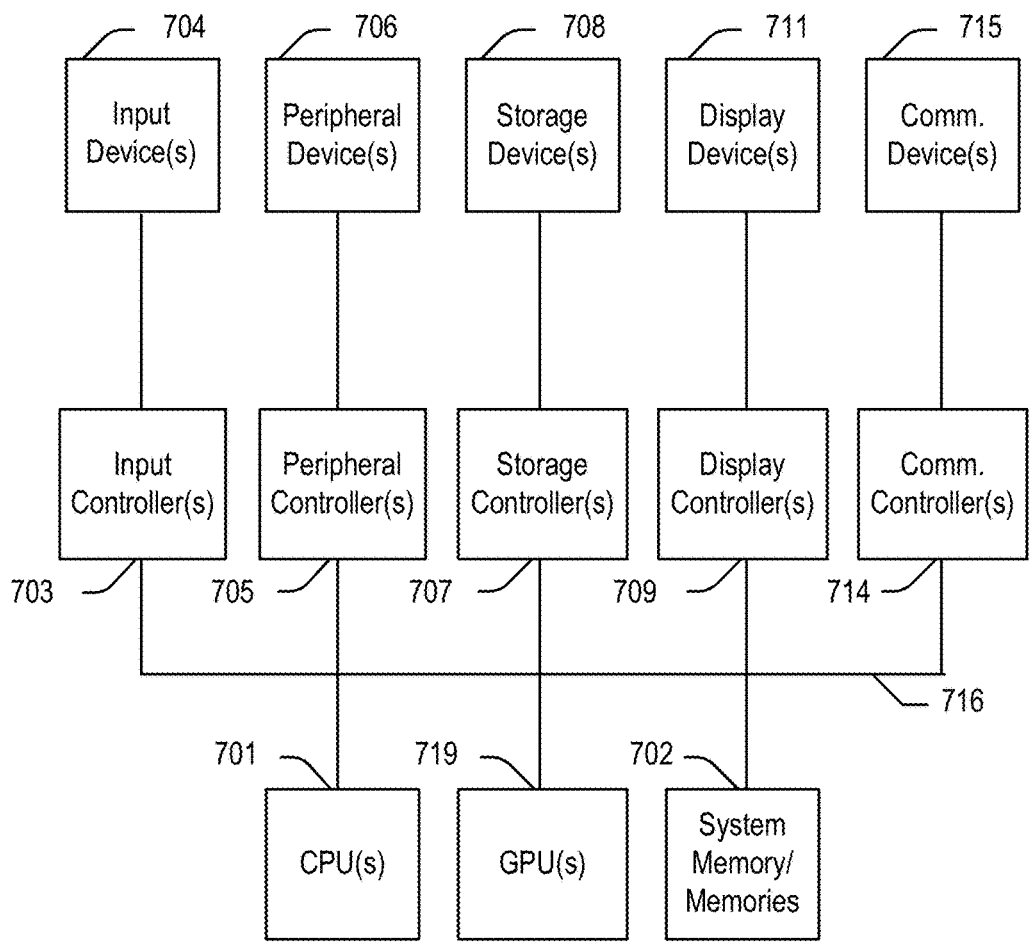
FIG. 7 depicts a simplified block diagram of a computing device/information handling system according to embodiments of the present document.

FIG. 7 depicts a simplified block diagram of a computing device/information handling system (or computing system) according to embodiments of the present disclosure. It will be understood that the functionalities shown for system 700 may operate to support various embodiments of a computing system—although it shall be understood that a computing system may be differently configured and include different components, including having fewer or more components as depicted in FIG. 7.

As illustrated in FIG. 7, the computing system 700 includes one or more central processing units (CPU) 701 that provides computing resources and controls the computer. CPU 701 may be implemented with a microprocessor or the like, and may also include one or more graphics processing units (GPU) 719 and/or a floating-point coprocessor for mathematical computations. System 700 may also include a system memory 702, which may be in the form of random-access memory (RAM), read-only memory (ROM), or both.

A number of controllers and peripheral devices may also be provided, as shown in FIG. 7. An input controller 703 represents an interface to various input device(s) 704, such as a keyboard, mouse, touchscreen, and/or stylus. The computing system 700 may also include a storage controller 707 for interfacing with one or more storage devices 708 each of which includes a storage medium such as magnetic tape or disk, or an optical medium that might be used to record programs of instructions for operating systems, utilities, and applications, which may include embodiments of programs that implement various aspects of the present invention. Storage device(s) 708 may also be used to store processed data or data to be processed in accordance with the invention. The system 700 may also include a display controller 709 for providing an interface to a display device 711, which may be a cathode ray tube (CRT), a thin film transistor (TFT) display, organic light-emitting diode, electroluminescent panel, plasma panel, or other type of display. The computing system 700 may also include one or more peripheral controllers or interfaces 705 for one or more peripherals 706. Examples of peripherals may include one or more printers, scanners, input devices, output devices, sensors, and the like. A communications controller 714 may interface with one or more communication devices 715, which enables the system 700 to connect to remote devices through any of a variety of networks including the Internet, a cloud resource (e.g., an Ethernet cloud, an Fiber Channel over Ethernet (FCoE)/Data Center Bridging (DCB) cloud, etc.), a local area network (LAN), a wide area network (WAN), a storage area network (SAN) or through any suitable electromagnetic carrier signals including infrared signals.

In the illustrated system, all major system components may connect to a bus 716, which may represent more than one physical bus. However, various system components may or may not be in physical proximity to one another. For example, input data and/or output data may be remotely transmitted from one physical location to another. In addition, programs that implement various aspects of the invention may be accessed from a remote location (e.g., a server) over a network. Such data and/or programs may be conveyed through any of a variety of machine-readable medium including, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices.

Aspects of the present invention may be encoded upon one or more non-transitory computer-readable media with instructions for one or more processors or processing units to cause steps to be performed. It shall be noted that the one or more non-transitory computer-readable media shall include volatile and non-volatile memory. It shall be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

It shall be noted that embodiments of the present invention may further relate to computer products with a non-transitory, tangible computer-readable medium that have computer code thereon for performing various computer-implemented operations. The media and computer code may be those specially designed and constructed for the purposes of the present invention, or they may be of the kind known or available to those having skill in the relevant arts. Examples of tangible computer-readable media include, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices. Examples of computer code include machine code, such as produced by a compiler, and files containing higher level code that are executed by a computer using an interpreter. Embodiments of the present invention may be implemented in whole or in part as machine-executable instructions that may be in program modules that are executed by a processing device. Examples of program modules include libraries, programs, routines, objects, components, and data structures. In distributed computing environments, program modules may be physically located in settings that are local, remote, or both.

One skilled in the art will recognize no computing system or programming language is critical to the practice of the present invention. One skilled in the art will also recognize that a number of the elements described above may be physically and/or functionally separated into sub-modules or combined together.

It will be appreciated to those skilled in the art that the preceding examples and embodiments are exemplary and not limiting to the scope of the present disclosure. It is intended that all permutations, enhancements, equivalents, combinations, and improvements thereto that are apparent to those skilled in the art upon a reading of the specification and a study of the drawings are included within the true spirit and scope of the present disclosure. It shall also be noted that elements of any claims may be arranged differently including having multiple dependencies, configurations, and combinations.

What is claimed is:

1. A computer-implemented method for denoising a noisy image using a deep residual network, the method comprising:

generating, using a first block comprising at least a mosaic stride convolutional layer, a convoluted output image from the noisy image, the mosaic stride convolutional layer comprises multiple strided convolutional channels to sample the noisy image into multiple sampled images with each sampled image filtered by a convolution at a stride into a filtered image, the filtered images from the multiple strided convolutional channels are merged for the generation of the convoluted output image;

generating, using one or more residual blocks in the deep residual network, an intermediate output image from the convoluted output image, each residual block comprises one or more layers of convolutions and rectified linear units (ReLUs) with a shortcut connection spanning the one or more layers of convolutions and ReLUs;

transforming, using a convolutional layer in the deep residual network, the intermediate output image to an estimated noise image; and subtracting the estimated noise image from the noisy image to obtain a denoised image.

2. The computer-implemented method of claim 1 wherein the deep residual network is pre-trained using a loss function that normalizes a $L^1$ loss between a plurality of ground-truth noise-free raw images and corresponding denoised images by noise standard deviation.

3. The computer-implemented method of claim 1 wherein the deep residual network is pre-trained using a training data dynamically augmented by adding random noise at different training iterations.

4. The computer-implemented method of claim 1 wherein the deep residual network is pre-trained with shifting a mosaic sampling window for training image by one pixel vertically or horizontally to increase mosaic sampling space.

5. The computer-implemented method of claim 1 wherein the noisy image has a mosaic pattern of w×h with C=w×h spectral channels, the mosaic stride convolutional layer has C=w×h strided convolutional channels, wherein w and h are integer numbers.

6. The computer-implemented method of claim 5 wherein each strided convolutional channel has a stride with a dimension of w×h and a convolution centered around one of the C spectral channels.

7. The computer-implemented method of claim 1 wherein the multiple sampled images have a same dimension as the noisy image.

8. The computer-implemented method of claim 1 wherein the first block further comprises one or more parameterized rectified linear unit (PReLU) filters following the mosaic stride convolution layer, the filtered images from the multiple strided convolutional channels are merged and then processed by the one or more PReLU filters such that the convoluted output from the first block is a rectified convoluted output.

9. The computer-implemented method of claim 1 wherein the first block comprises multiple mosaic stride convolutional layers coupled in series for multiple implementations of sampling, strided convolution, and merging, each mosaic stride convolutional layer is followed by one or more parameterized rectified linear unit (PReLU) filters.

10. A method for training a deep residual network for image denoising, the method comprising:

inputting a set of training image pairs, in which a training image pair comprising a noise-free image and a noisy image corresponding to the noise-free image and both the noise-free image and the noisy image have a mosaic pattern, into a deep residual network, the deep residual network comprising a first block, one or more residual blocks, and a final block, the first block comprises a mosaic stride convolutional layer;

generating, using the deep residual network, a denoised image for each noisy image, with steps comprising:

generating, using the mosaic stride convolutional layer, a convoluted output image from a noisy image, the mosaic stride convolutional layer comprises multiple strided convolutional channels to sample the noisy image into multiple sampled images with each sampled image filtered by a convolution at a stride into a filtered image, the filtered images from the multiple strided convolutional channels are merged into the convoluted output image;

generating, using one or more residual blocks in the deep residual network, an intermediate output image from the convoluted output image;

transforming, using a convolutional layer in the deep residual network, the intermediate output image to an estimated noise image; and subtracting the estimated noise image from the noisy image to obtain the denoised image; and training the deep residual network using a loss function involving a loss between a plurality of ground-truth noise-free raw images and corresponding denoised images.

11. The method of claim 10 wherein the loss between a plurality of ground-truth noise-free raw images and corresponding denoised images is a $L^1$ loss, the loss function normalizes the $L^1$ loss by noise standard deviation.

12. The method of claim 10 wherein noisy images of the set of training image pairs are dynamically augmented from corresponding noise-free images by adding noise to the corresponding noise-free images at different training iterations.

13. The method of claim 10 wherein noisy images of the set of training image pairs are obtained by shifting a mosaic sampling window for mosaic sampling by one pixel vertically or horizontally to increase mosaic sampling space.

14. The method of claim 10 wherein the noisy image has a mosaic pattern of w×h, the mosaic stride convolutional layer has C=w×h strided convolutional channels, wherein w and h are integer numbers, each strided convolutional channel has a stride with a dimension of w×h and a convolution.

15. A non-transitory computer-readable medium or media comprising one or more sequences of instructions which, when executed by one or more processors, causes the steps for denoising a noisy image to be performed comprising:

sampling the noisy image, in a mosaic stride convolutional layer comprising multiple strided convolutional filters, into multiple sampled images;

filtering each of the multiple sampled images with a corresponding strided convolution filter with a convolution kernel at a stride into a filtered image;

merging all filtered images into a convoluted output image;

generating, using one or more residual blocks in a deep residual network, an intermediate output image from the convoluted output image, each residual block comprises one or more layers of convolutions and rectified linear units (ReLUs) with a shortcut connection spanning the one or more layers of convolutions and ReLUs;

transforming, using a convolutional layer, the intermediate output image to an estimated noise image; and subtracting the estimated noise image from the noisy image to obtain a denoised image.

16. The non-transitory computer-readable medium or media of claim 15 wherein the noisy image has a mosaic pattern of w×h, the mosaic stride convolutional layer has C=w×h strided convolutional channels, wherein w and h are integer numbers.

17. The non-transitory computer-readable medium or media of claim 16 wherein the strided convolution filter has the stride with a dimension of w×h.

18. The non-transitory computer-readable medium or media of claim 15 wherein the multiple sampled images have a same dimension as the noisy image.

19. The non-transitory computer-readable medium or media of claim 15 wherein the noisy image is captured using a multispectral filter arrays (MSFA) camera or a color filter array (CFA) camera.

20. The non-transitory computer-readable medium or media of claim 19 wherein each of the strided convolutional filters is centered around one of spectral channels of the noisy image.

* * * * *